R. Hill,
Pipe Coupling.
No. 96,914.  Patented Nov. 16, 1869.
Fig. 1.
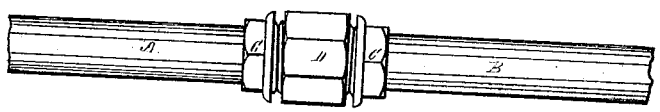
Fig. 2.
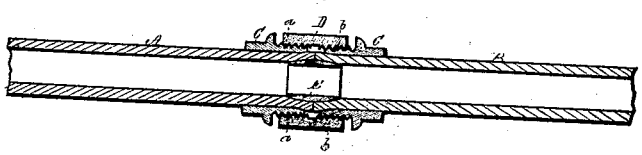
Fig. 3.  Fig. 4.
  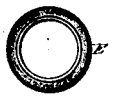
Witnesses  Rowland Hill
by his attorney

United States Patent Office.

ROWLAND HILL, OF EAST BOSTON, MASSACHUSETTS.

Letters Patent No. 96,914, dated November 16, 1869.

IMPROVEMENT IN PIPE-COUPLING.

The Schedule referred to in these Letters Patent and making part of the same

*To all persons to whom these presents may come:*

Be it known that I, ROWLAND HILL, of East Boston, of the county of Suffolk, and State of Massachusetts, have invented a new and useful or Improved Pipe-Coupling; and do hereby declare the same to be fully described in the following specification, and represented in the accompanying drawings, of which—

Figure 1 is a side view of it, and two pipes as coupled by it.

Figure 2 is a longitudinal section of it and the two pipes.

Figure 3 is a side view, and

Figure 4, an end view of the duplex tapering thimble employed with the cap-tube and annular screws, for effecting the coupling of the pipes.

In the drawings, A and B denote the two pipes.

Each of such pipes, previous to being coupled to the other, is to have its end which is to enter the coupling expanded by a cone driven into such end.

Before, however, doing this, one of the annular screws C C is to be slipped on the pipe, so as to encompass it.

These screws, formed as represented in the drawings, have the thread of one pitched in a direction opposite to that of the other; in a word, one is a right and the other a left screw, the same being so that when the two screws are screwed into or are in engagement with their common tubular nut D, the revolution of such nut in one direction shall cause the screws to simultaneously approach one another, provided they do not revolve, and when the nut is revolved in the opposite direction, it shall cause the screws to recede from one another, provided they do not revolve.

The tubular nut D is a short prismatic tube, having a cylindrical bore, provided with reversed female screws *a b*, to receive the tubular male screws C C, each of which has a prismatic external surface to enable a wrench to be applied to it.

The thimble seen at E is a short tube, tapered externally from its middle toward both of its ends, the tube being largest in diameter at its middle.

The two pipes A B having had the two screws C C arranged on them, and having had their ends expanded by means as described, are to be inserted into the tubular nut D, and upon the duplex tapering thimble E, in manner as shown in fig. 2, after which the two screws should be held from revolving, and the tubular nut D should be revolved so as to cause the screws C C to approach one another and crowd the pipes toward each other and upon the two tapers of the thimble. The thimble, in the mean time, will expand the pipes into the tubular nut, and against the bore thereof, so as to make close joints. Generally the two pipes will be crowded together at their ends so as there to make a tight joint.

I make no claim to the pipe-coupling as represented and claimed in the United States patent, No. 91,319, granted June 15, 1869, to James J. Fifield, wherein two wedge-rings are employed with a duplex bell-mouth coupling-pipe, and with two screw-nuts, the latter being screwed on the external surface of the coupling-pipe.

I make use of a single double tapering thimble to go into both pipes to be coupled, and I also employ two annular screws to screw into the tubular nut, and against the pipes, so as to crowd them on the thimble, and thereby expand them and set them together or toward one another. Thus, my coupling differs materially in construction, as well as in mode of operation, from that of Fifield, although the two are somewhat analogous.

I claim, as my invention—

The pipe-coupling, as hereinbefore described, as composed of the right and left or annular screws C C, the tubular nut D, and the duplex tapering thimble E, the whole being to operate with and couple two pipes, substantially in the manner as specified.

ROWLAND HILL.

Witnesses:
R. H. EDDY,
S. N. PIPER.